US007278704B2

(12) United States Patent
Maeyama et al.

(10) Patent No.: US 7,278,704 B2
(45) Date of Patent: Oct. 9, 2007

(54) IMAGE FORMING APPARATUS

(75) Inventors: Ryuichiro Maeyama, Ebina (JP); Kenichi Kobayashi, Ebina (JP); Tomoshi Hara, Minamiashigara (JP); Kazuyuki Tsukamoto, Kanagawa (JP); Koji Morofuji, Ebina (JP); Tsutomu Udaka, Ebina (JP); Shinichi Tai, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 446 days.

(21) Appl. No.: 11/057,378

(22) Filed: Feb. 15, 2005

(65) Prior Publication Data

US 2006/0001691 A1 Jan. 5, 2006

(30) Foreign Application Priority Data

Jul. 1, 2004 (JP) ............................ 2004-195926

(51) Int. Cl.
*B41J 29/393* (2006.01)
*G03G 15/00* (2006.01)
*G01N 21/86* (2006.01)

(52) U.S. Cl. ...................... 347/19; 399/45; 250/559.01

(58) Field of Classification Search .................. 347/19; 399/45; 250/559.01
See application file for complete search history.

(56) References Cited

U.S. PATENT DOCUMENTS 6,179,418 B1 * 1/2001 Mizoguchi et al. ......... 347/102
7,007,950 B2 * 3/2006 Im ........................ 271/258.01
7,058,323 B2 * 6/2006 Maeyama et al. ............ 399/45
7,062,183 B2 * 6/2006 Maeyama et al. ............ 399/45
7,147,316 B2 * 12/2006 Hayashi et al. ............. 347/104

FOREIGN PATENT DOCUMENTS

JP 2001-235906 A 8/2001

* cited by examiner

*Primary Examiner*—Stephen Meier
*Assistant Examiner*—Rene Garcia, Jr.
(74) *Attorney, Agent, or Firm*—Morgan, Lewis & Bockius LLP

(57) ABSTRACT

An image forming apparatus having an image forming part that forms an image on a recording medium measures, downstream of the image forming part in a transport path of the recording medium, speckles on the recording medium, and generates measured speckle data that represents speckles measured; stores the generated measured speckle data in a memory part, further measures, upstream of the image forming part in a transport path of a recording medium, the speckles of the recording medium; determines whether speckle data representing speckles analogous to speckles measured upstream of the image forming part is stored in the memory part, and, in the case where the decision result is affirmative, recognizes that the recording medium for which the speckles have been measured is a recording medium on which an image has been formed on it previous to having speckles measured upstream of the image forming part.

5 Claims, 4 Drawing Sheets

IMAGE FORMING APPARATUS

BACKGROUND OF THE INVENTION

1. Field of the Invention

The present invention concerns a technique to determine the classification of sheets used in image forming apparatus.

2. Description of the Related Art

In recent years, with a view toward environmental problems and recycling of resources, workplaces using large quantities of paper in copying machines and printers and the like have begun reusing sheets of paper ordinarily used for forming images on only one side of them by forming images on the blank side of them on the opposite side of which images have already been recorded (hereafter, "reversed sheets").

Because the reversed sheets are increasingly being used in image forming apparatus, inventions that address the use of the reversed sheets have appeared, for example inventions that improve the efficiency of use of reversed sheets (for example, see Japanese Patent Application Laid-Open Publication 2001-235906, hereinafter, JP 2001-235906).

The image forming apparatus disclosed in JP 2001-235906 is equipped with a storage part for blank paper that stores unused paper and with a reversed sheet storage part that stores reversed sheets. When a sensor in this image forming apparatus detects paper in the reversed sheet storage part, the user selects whether to form images on unused sheets or on reversed sheets, and if the use of reversed sheets is selected, the apparatus forms images on the paper stored in the reversed sheet storage part.

For an image forming apparatus that forms images using an electrophotography system, heat and pressure are applied to the paper for the purpose of fixing the image; however, the absorbed moisture in unused paper evaporates, and the paper lengthens. As well, for image forming apparatus based on inkjet systems, swelling of the paper occurs because of absorption of ink in the spaces between the fibers of the paper (capillarity), and this causes the paper to lengthen, in much the same way that paper is lengthened by fixing. For this reason, it is desirable to form images on unused paper taking such lengthening into account, and for reversed sheets, because this lengthening has already arisen due to fixing, it is desirable to form images taking into account the absence of lengthening.

For the image forming apparatus disclosed in JP 2001-235906, in the case where paper is provided from the reversed sheet storage part, because the stored paper is reversed sheets, it is desirable not to correct the images. However, for the image forming apparatus disclosed in JP 2001-235906, because the configuration of each storage part is identical, there is the problem that the user might confuse unused sheets and reversed sheets and store the wrong paper by mistake. If the user confuses the storage of unused sheets and reversed sheets, and image corrections for unused paper will end up being done on reversed sheets, giving rise to the problem that the image formed will differ from the intended image.

SUMMARY OF THE INVENTION

The present invention addresses the above problems, and provides a technique for detecting before image formation that a piece of paper is a reversed sheet, i.e., a sheet with an image already formed on it.

In one aspect, the present invention provides an image forming apparatus including: an image forming part that forms an image on a recording medium; a first measuring part that, downstream of the image forming part in a transport path of the recording medium, measures speckles on the recording medium in the transport path, and generates measured speckle data that represents speckles measured; a memory part that stores measured speckle data generated by the first measuring part; a second measuring part that, upstream of the image forming part in a transport path of a recording medium, measures the speckles of a recording medium in the transport path; and a recognition part that determines whether or not speckle data representing speckles analogous to speckles measured by the second measuring part is stored in the memory part, and, in the case where the decision result is affirmative, recognizes that the recording medium for which the speckles have been measured by the second measuring part is a recording medium on which an image has been formed previously to having speckles measured by the second measuring part.

This image forming apparatus, after forming an image on a recording medium, measures the speckles on the recording medium with the image formed on it, and records data representing the measured speckles. As well, the image forming apparatus measures speckles before forming an image on the recording medium, and in the case where the data representing the speckles is analogous to that for the measured speckles, recognizes that the recording medium already has an image formed on it, i.e., that it is the reversed sheet.

According to an embodiment of the invention, it is possible to detect before image formation that a sheet on which an image is to be formed is a reversed sheet.

BRIEF DESCRIPTION OF THE DRAWINGS

Embodiments of the present invention will be described in detail based on the following figures, wherein.

DETAILED DESCRIPTION OF THE INVENTION

Below, description will be given of an embodiment of the present invention.

A. Configuration of the Embodiment

Figure 1:
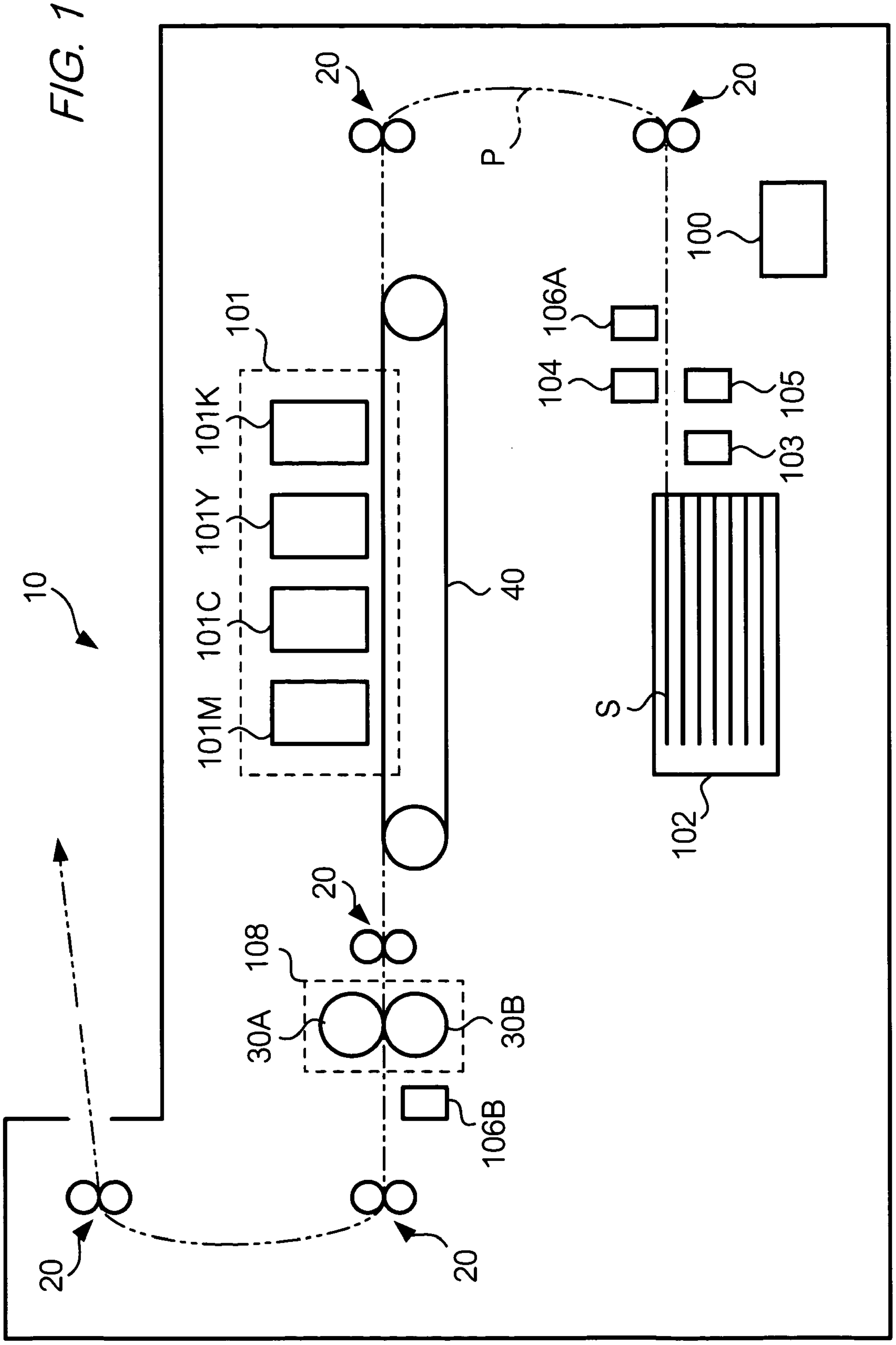
FIG. 1 illustrates an overall composition of image forming apparatus according to an embodiment of the present invention.

FIG. 1 shows an overall configuration of an image forming apparatus 10 according to an embodiment of the present invention. Image forming apparatus 10 forms color images on sheets using an inkjet system.

Control part 100 is connected to each part of image forming apparatus 10 and controls each part. The details of control part 100 will be described later.

A sheet storage part 102 stores sheets S, such as unused sheets and reversed sheets, that are the recording medium for image formation. Sheet storage part 102 ejects stored sheet S toward a transport path P in the figure using a roller (not shown).

A sheet detection part 103 is disposed along transport path P upstream of recording head parts 101. Sheet detection part 103 is equipped with an optical sensor (not shown), and using this optical sensor detects the paper ejected from sheet storage part 102 and outputs to control part 100 a signal indicating that the paper has been detected.

A sheet vibrator part 104 is disposed along transport path P upstream of recording head parts 101, and under the control of control part 100, vibrates sheet S in transport path P.

A vibration detection part 105 is disposed along transport path P upstream of recording head parts 101, and is equipped with a vibration sensor (not shown.) Vibration detection part 105 detects vibrations in the sheet S vibrated by sheet vibrator part 104 and outputs to control part 100 an electronic signal modulated by the vibrations detected.

Speckle measuring parts 106A and 106B measure speckles that arise on sheet S in transport path P. High-contrast patterns of irregular speck shapes are revealed when exposing bodies to a coherent light such as laser light when the roughness of the bodies is sufficiently great compared to the wavelength of this light. Because the speckles represent characteristic patterns that depend on the type of a sheet S, it is possible to distinguish the type of sheet S by speckle measurement.

For the present embodiment, speckle measuring part 106A is on the side of the sheet S ejected from sheet storage part 102 that is opposite the surface on which the image is formed and is disposed along transport path P upstream of recording head parts 101. As well, speckle measuring part 106B is on the side of the sheet S ejected from sheet storage part 102 that is opposite the surface on which the image is formed, and is disposed along transport path P downstream of fixing part 108. Alternatively, at least one of speckle measuring part 106A and 106B may be disposed on the side of the sheet S ejected from sheet storage part 102 that is the same surface on which the image is formed. It is to be noted that, because the compositions of speckle measuring parts 106A and 106B are the same, hereafter, whenever there is no need to distinguish the two, they will be referred to as a speckle measuring part 106.

Figure 2:
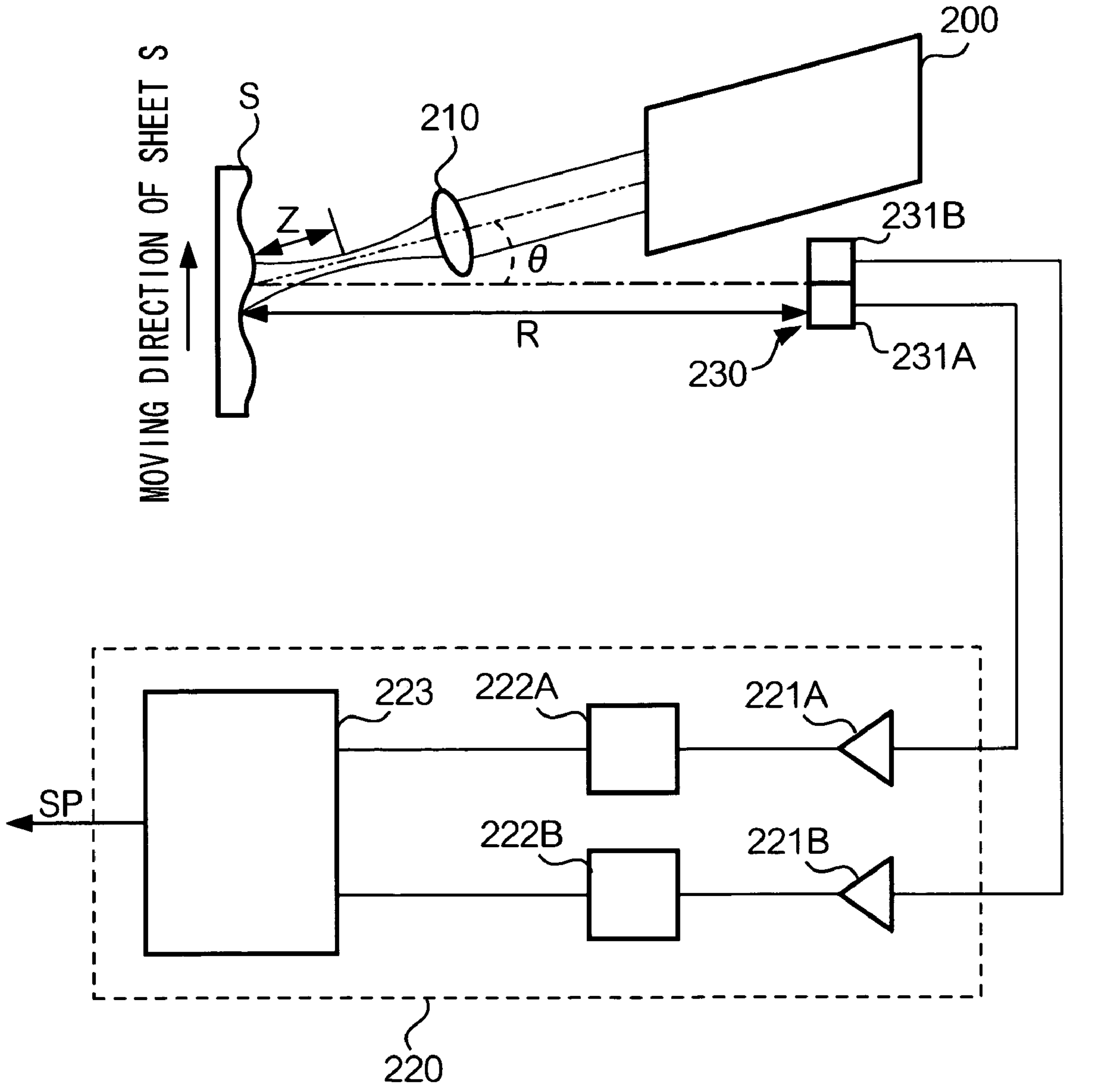
FIG. 2 illustrates a configuration of a speckle measuring part 106.

Speckle measuring part 106, as shown in FIG. 2, is furnished with a light source 200 that projects a coherent light (for example, laser light) onto sheet S on transport path P, a lens 210 that converts the light generated from light source 200 into a Gauss beam, an image sensor 230 equipped with a photodiode group that outputs a signal corresponding to the strength of the light received, and a detection circuit 220 that outputs a binarized signal by binarizing the signals output from the various photodiodes. In FIG. 2, for the sake of simplicity of the diagram, among the photodiodes with which image sensor 23 is equipped, only photodiodes 231A and 231B are shown.

Detection circuit 220 is, for each photodiode, furnished with an amplifier that amplifies the signal input from the photodiode, and a binarization part that binarizes the signals amplified by the amplifier and outputs the binarized signal. As well, detection circuit 220 is equipped with a signal processor 223 by creating from signals output by the binarization parts a speckle signal SP representing speckles sensed by the image sensor, and outputs speckle signal SP to control part 100. It is to be noted that, in FIG. 2, for the sake of simplicity of the diagram, only amplifier 221A and binarization part 222A corresponding to photodiode 231A, and amplifier 221B and binarization part 222B corresponding to photodiode 231B, are shown.

Sheet transport rollers 20 transport sheet S ejected from sheet storage part 102 along transport path P of the figure, and move sheet S up to a location opposite recording head parts 101. As well, sheet transport rollers 20 move sheet S on which ink has been applied by recording head parts 101 toward fixing part 108 along transport path P, and ejects sheet S that has passed through fixing part 108 toward the exterior of image forming apparatus 10.

A transport belt 40 is rotated by two rollers that are rotated by motors (not shown). Transport belt 40, while assuring a fixed distance between sheet S on transport path P and the various heads of recording head parts 101, moves sheet S in the direction of fixing part 108.

Recording head parts 101 form an image on sheet S in transport path P by spraying ink. As shown in FIG. 1, recording head parts 101 are equipped with recording head parts 101Y, 101M, 101C and 101K that spray the respective inks for each of the colors Y (Yellow), M (Magenta), C (Cyan) and K (black), and spray these inks toward sheet S using inkjet systems.

Fixing part 108, as shown in FIG. 1, is disposed downstream of recording head parts 101 along transport path P, and is furnished with a pressure roller 30A, and a heating roller 30B that is disposed so as to be opposite pressure roller 30A with respect to transport path P for the paper. Heat and pressure are applied to sheet S sprayed with ink from recording head parts 101 by passing it through the "nip" region that mutually contacts pressure roller 30A and heating roller 30B. In this manner, ink forming an image on sheet S is fixed on paper.

Figure 3:
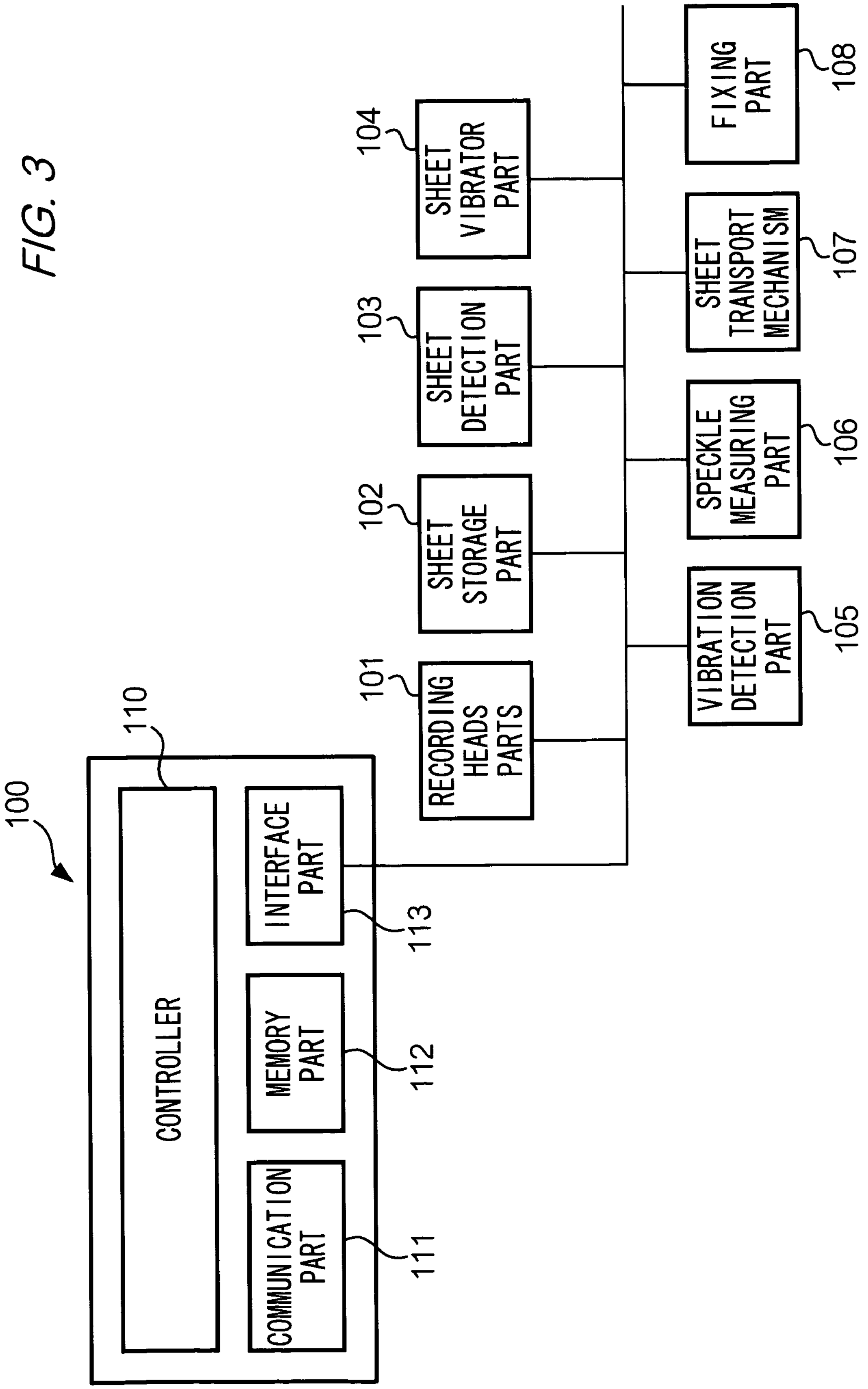
FIG. 3 is a block diagram of a composition of main elements of a control part 100.

Next, the composition of control part 100 is described. FIG. 3 is a block diagram showing the hardware configuration of control part 100, especially of the main parts of control part 100. Control part 100 is equipped with a controller 110 consisting of CPU (Central Processing Unit), ROM (Read Only Memory), RAM (Random Access Memory) and the like, a memory part 112 furnished with a nonvolatile memory, an interface part 113, and a communications part 111.

Communications part 111 is equipped with interface functions that perform communications with computer apparatus such as personal computers, and receives data sent from such computer apparatus. Interface part 113 is connected through a bus to recording head parts 101, sheet storage part 102, sheet detection part 103, sheet vibrator part 104, vibration detection part 105, speckle measuring part 106, sheet transport mechanism 107 furnished with motors that drive the respective rollers, fixing part 108, and the like. Through a bus, interface part 113 receives signals provided from each part and outputs signals for controlling each part.

Memory part 112 is connected to controller 110, and stores standard speckle data representing speckles that arise from unused sheets in a standard speckle storage region for each sheet type. As well, memory part 112 stores control states each corresponding to standard speckle data for each part of image forming apparatus 100. As well, memory part 112 records measured speckle data representing speckles measured by speckle measuring part 106B in correspondence with the respective type of sheet S.

A control program is stored in the ROM. When the power for image forming apparatus 10 is turned on, the CPU reads out and starts up the control program stored in the ROM. When the CPU starts the control program, it enables functions that form images on sheet S according to printer data that is input to communications part 111.

B. Operation Examples of the Embodiment

Next, example operations of the above image forming apparatus will be described.

It is to be noted that, in the explanation below, after describing the operations in the case of recording an image on an unused sheet, an example of operations in the case of using as a reversed sheet S that already records an image is described.

B-1. Example Operations in the Case of Forming an Image on Unused Paper

Figure 4:
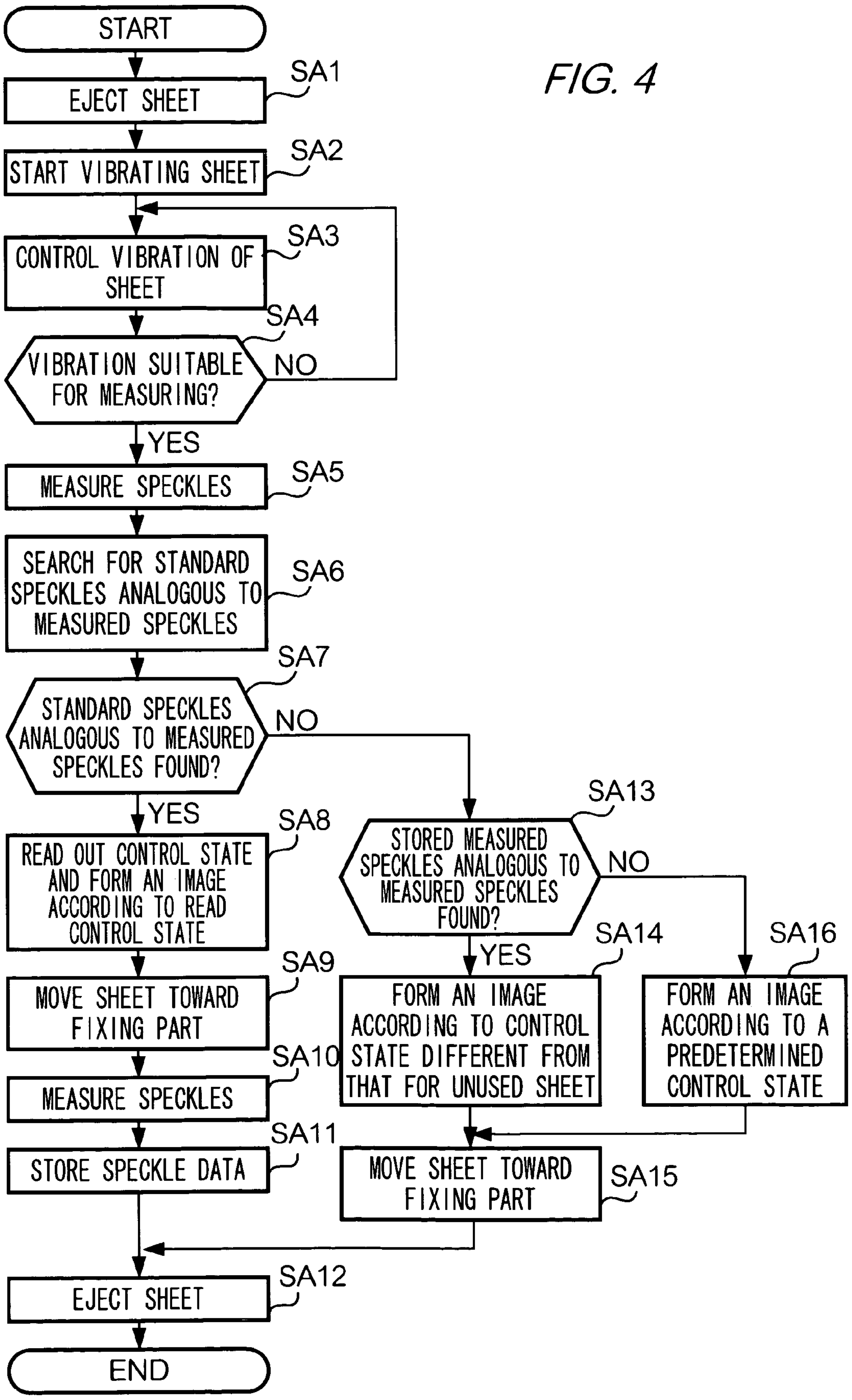
FIG. 4 is a flowchart showing the flow of operations performed by control part 100.

When personal computer apparatus connecting to communications part 111 sends print data, this print data is received by communications part 111 and stored in the RAM of the controller 110. When control part 100 receives the print data, it directs sheet storage part 102 to eject sheet S stored in sheet storage part 102 toward transport path P (FIG. 4: Step SA1).

When sheet detection part 103 detects sheet S ejected into transport path P, a signal indicating that paper has been detected is output from sheet detection part 103 to control part 100. When this signal is input into interface part 113, control part 100 directs sheet vibrator part 104 to vibrate sheet S in transport path P (Step SA2). Speckles can be measured without vibrating sheet S, but by vibrating sheet S, the patterns of the characteristic speckles of sheet S become conspicuously evident. For this reason, sheet S is vibrated before starting the measurement of speckles. Vibration detection part 105 detects these vibrations of sheet S, converts the vibrations detected to an electronic signal, and outputs that signal to control part 100. Control part. 100, so as to make suitable vibrations for speckle measurement, controls the vibration of sheet S based on this signal (Step SA3).

When control part 100 determines that the vibrations of sheets S have become suitable for measuring speckles (Step SA4: YES), it controls speckle measuring part 106A to start the measurement of speckles (Step SA5). First, control part 100 directs speckle measuring part 106 to emit laser light from light source 200. The laser light emitted from light source 200 is converted to a Gauss beam by lens 210. Then the laser light converted into a Gauss beam impinges on sheet S, and the laser light impinging on sheet S is diffused by the surface roughness of sheet S. The photodiode group in image sensor 230 receives this diffused light.

Photodiode 231A outputs to amplifier 221A a signal corresponding to the strength of the diffused light received. As well, photodiode 231B outputs to amplifier 221B a signal corresponding to the strength of the diffuse light received. The signals amplified by amplifiers 221A and 221B are converted to binarized signals by inputting them into binarization parts 222A and 222B. These binarized signals are input to signal processor 223. Signal processor 223 generates from this binarized signal a speckle signal SP representing speckles sensed by the image sensor, and outputs that binarized signal to control part 100.

When control part 100 receives speckle signal SP, it reads out standard speckle data stored in a standard speckle storage area of memory part 112. Control part 100 performs pattern matching on the speckles represented by speckle signal SP and speckles represented by standard speckle data, and searches for standard speckle data representing speckles analogous to the speckles represented by speckle signal SP (Step SA6).

When control part 100 finds standard speckle data representing speckles analogous to the speckles represented by speckle signal SP (Step SA7: Yes), it reads out control state that corresponds to this standard speckle data.

Control part 100 controls sheet transport mechanism 107 according to the control state, and moves sheet S up to the location of recording head parts 101. As well, control part 100 controls recording head parts 101 according to the control state and forms an image represented by the print data on sheet S (Step SA8).

When the formation of the image on sheet S is complete, control part 100 directs sheet transport mechanism 107 to move sheet S toward fixing part 108 (Step SA9). When sheet S being moved to fixing part 108 passes the "nip" region, heat and pressure are added, and ink forming an image for sheet S is fixed on sheet S.

Next, control part 100 controls speckle measuring part 106B and measures the speckles of the sheet S that has passed through the fixing part 108 (Step SA10). The sheet S that has passed through fixing part 108 will have been lengthened, in comparison to an unused sheet, by the heat and pressure. For this reason, when measuring the speckles using speckle measuring part 106B, as long as the sheets are of the same type, the speckles measured will differ from the speckles as they are before sheet S is used. Speckle measuring part 106B outputs to control part 100 a speckle signal SP representing these measured speckles. Control part 100 generates speckle data representing speckles that are represented by the speckle signal SP, and stores the generated speckle data in a measured speckle storage region of memory part 112 (Step SA11). When control part 100 completes the measurement of speckles used in speckle measurement part 106B, it directs sheet transport mechanism 107 to eject sheet S toward the exterior of image forming apparatus 10 (Step SA12).

In this way, when image forming apparatus 10 forms and image on an unused sheet S, it measures the speckles of sheet S after the fixing process, and stores measured speckle data representing the speckles measured.

B-2. Example Operations in the Case of Using the Reversed Sheet

Next, the operations in the case of using the reversed sheet S on which an image has been formed by the example operations above will be explained. Explanation is omitted for the operations up to the point where sheet S is ejected from sheet storage part 102 and measurement of speckles by speckle measuring part 106 is begun, these operations being identical to the example operations described above.

When control part 100, using a signal output from vibration detection part 105, determines that the vibrations of sheets S have become suitable for measuring speckles, it causes laser light to be emitted from light source 200. Laser light emitted from light source 200 is converted into a Gauss beam by lens 210. When the laser light converted to a Gauss beam impinges on sheet S, the laser light impinging on sheet S is diffused by the surface roughness of sheet S.

Because sheet S is the reversed sheet, the dispersion of the laser light will differ from how it is dispersed from an unused sheet S. In other words, speckles will arise that differ from the speckles that arise from an unused sheet S. Moreover, here, because sheet S is a sheet on which an image has been formed by the example operations above, the speckles that arise in this situation will be the same speckles as those measured by speckle measuring part 106B by the example operations above.

Speckle measuring part 106A measures speckles and when it outputs speckle signal SP, the speckle signal SP output is input into control part 100. When control part 100 receives speckle signal SP, it performs pattern matching between the speckles represented by speckle signal SP and the speckles represented by standard speckle data stored in memory part 112, and detects standard speckle data that represents speckles analogous to those represented by speckle signal SP. Here, the type of sheet S will be the same as that of a sheet used for the example operations above, but because sheet S is a reversed sheet that has been lengthened, the speckles represented by speckle signal SP will differ from the speckles that arise from an unused sheet. For this reason, speckles represented by speckle signal SP will not be analogous to any standard speckle data (Step SA7; NO).

When control part 100 determines that speckles represented by speckle signal SP are not analogous to any standard speckle data, it reads out speckle data stored in a measured speckle region of memory part 112 and detects speckle data that represents speckles that are analogous to speckles represented by speckle signal SP. Because speckle data representing speckles of sheet S used as a reversed sheet is stored in the measured speckle storage area of memory part 112 by the above operations, control part 100 detects speckle data representing speckles that are analogous to speckles represented by speckle signal SP. When control part 100 finds, in data stored in the measured speckle storage region speckle data representing speckles analogous to speckles measured by speckle measuring part 106A (Step SA13: YES), it determines that the sheet in transport is a reversed sheet.

When control part 100 determines that a sheet in transport is a reversed sheet, it controls each part of image forming apparatus 10 using control states (such as "do not perform image correction") different from the control states used in forming images on unused paper, and forms, on the sheet S that is a reversed sheet, an image represented by the print data (Step SA14). Moreover, when control part 100 decides "NO" for Step SA13, i.e., when it will not be able to decide the type of sheet S, it performs image formation by controlling each part using some predetermined control state (Step SA16). When control part 100 completes the formation of an image on sheet S, it directs sheet transport mechanism 107 to move sheet S toward fixing part 108. When sheet S transported to fixing part 108 passes the "nip" region, it adds heat and pressure to fix ink that forms an image on sheet S. Next, control part 100 directs sheet transport mechanism 107 to eject the sheet S that has passed through fixing part 108 toward the exterior of image forming apparatus 10 (Step SA12). At this point, control part 100 ejects sheet S without performing a measurement of speckles using speckle measurement part 106B.

With the embodiment explained above, by measuring speckles, it is possible to detect whether or not a sheet is a reversed sheet before forming an image on the sheet. Then, because image forming apparatus 100 controls each part in response to detection results, it is possible to increase the image quality of the image formed.

C. Modifications

Above, an embodiment of the present invention has been described, but it is possible to realize the present invention by modifying the above embodiment as described below.

For the above embodiment, although it measures speckles by vibrating sheet S, image forming apparatus 10 may measure speckles without vibrating sheet S. As well, for the above embodiment, it is also possible to provide it with a sheet vibrator part and a vibration detection part in the vicinity of speckle measuring part 106B and vibrate sheet S when the speckles of sheet S are measured by speckle measuring part 106B.

Though the image forming apparatus is equipped with a fixing unit in the above embodiment, a fixing unit need not be provided. As well, in the above embodiment, although image forming apparatus 10 forms images on sheet S using an inkjet system, the systems for forming the images are not limited to inkjet systems, and may, for example, be electrophotography systems. In the case where images are formed on sheet S using an electrophotography system, one may provide speckle measuring part 106A in the vicinity of the sheet storage part in which sheet S is stored, and speckle measuring part 106B may be provided along the transport path and downstream of a fixing roller that sets images on sheet S provided. With such an embodiment, it is possible to measure speckles on paper that has been lengthened by the evaporation of moisture.

Sheets transported by image forming apparatus 10 are not limited to paper sheets. Because speckles arise on sheets of transparent film of the kind used in OHP (Overhead Projector) film, it is also possible to measure the speckles for such sheets, and detect whether or not they have been used.

For the above embodiments, instead of using speckles as in the embodiments mentioned above, one may determine if a sheet is an unused sheet or is a reversed sheet using speckle vector patterns. For speckle vector patterns, it is possible to seek measured speckles for very small time differences for example by using cross correlation methods. For the above embodiments, vector patterns arising from unused sheets are measured and sought in advance, and data representing these found vector patterns are recorded in memory part 112. As well, control part 100 controls speckle measuring part 106B after the fixing process, searches for vector patterns from speckles measured for very small time differences, and stores data representing the found vector patterns in memory part 112. Control part 100 controls speckle measuring part 106A when performing image formation, and finds speckle vector patterns measured for small time differences. Then, with the vector patterns stored in memory part 112, it determines the analogous vector patterns that are measured and acquired, and it determines whether or not sheet S is a reversed sheet.

The foregoing description of the embodiments of the present invention has been provided for the purposes of illustration and description. It is not intended to be exhaustive or to limit the invention to the precise forms disclosed. Obviously, many modification and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-195926 filed on Jul. 1, 2004 including specification, claims, drawings and abstract is incorporated herein by reference in its entirety.

What is claimed is:

1. An image forming apparatus comprising:

an image forming part that forms an image on a recording medium;

a first measuring part that, downstream of the image forming part in a transport path of a recording medium, measures speckles on the recording medium in the transport path, and generates measured speckle data that represents speckles measured;

a memory part that stores the measured speckle data generated by the first measuring part;

a second measuring part that, upstream of the image forming part in a transport path of a recording medium, measures the speckles of the recording medium in the transport path; and a recognition part that determines whether or not speckle data representing speckles analogous to speckles measured by the second measuring part is stored in the memory part, and, in the case where the decision result is affirmative, recognizes that the recording medium for which the speckles have been measured by the second measuring part is a recording medium on which an image has been formed previously to having speckles measured by the second measuring part.

2. The image forming apparatus of claim 1, further comprising:

a fixing part that fixes on the recording medium an image formed on the recording medium by the image forming part, wherein the first measuring part, downstream of the fixing part in the transport path of the recording medium, measures speckles of the recording medium in the transport path.

3. The image forming apparatus of claim 1, further comprising:

a first vibration part that vibrates the recording medium transported to a vicinity of the first measuring part in the transport path; and a second vibration part that vibrates the recording medium transported to a vicinity of the second measuring part in the transport path.

4. The image forming apparatus of claim 2, further comprising:

a first vibration part that vibrates the recording medium transported to a vicinity of the first measuring part in the transport path; and a second vibration part that vibrates the recording medium transported to a vicinity of the second measuring part in the transport path.

5. The image forming apparatus of claim 1, wherein the first measuring part performs, at predetermined time intervals, measurement of speckles for a recording medium moved along the transport path, derives speckle vectors from speckles measured at the predetermined time intervals, and generates measured vector data representing the derived vectors;

the memory part stores the measured vector data generated by the first measuring part;

the second measuring part performs, at predetermined time intervals, measurement of speckles for a recording medium moved along the transport path, and derives speckle vectors from speckles measured at the predetermined time intervals; and the recognition part determines whether vector data representing a vector analogous to a vector derived by the second measuring part is stored in the memory part, and in the case where the decision result is affirmative, recognizes that the recording medium for which the vector has been measured by the second measuring part is a recording medium on which an image has been formed previous to having its vector measured by the second measuring part.

* * * * *